…

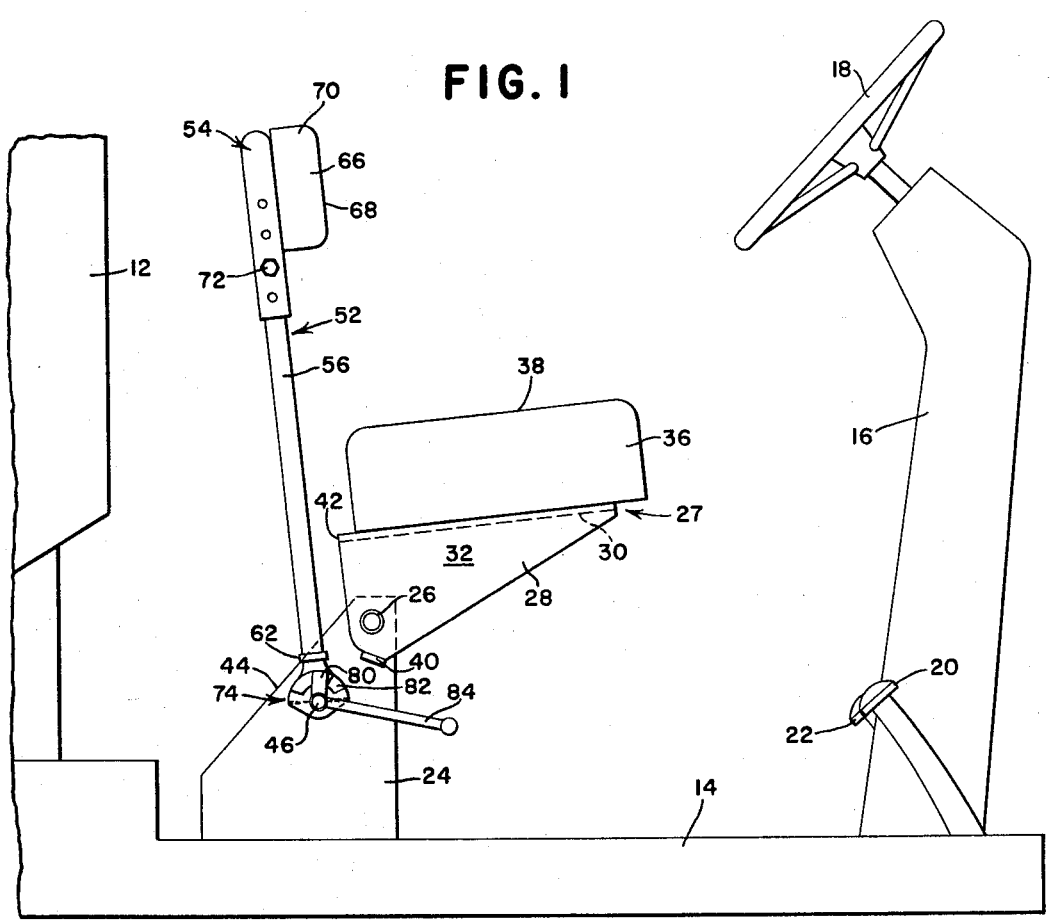
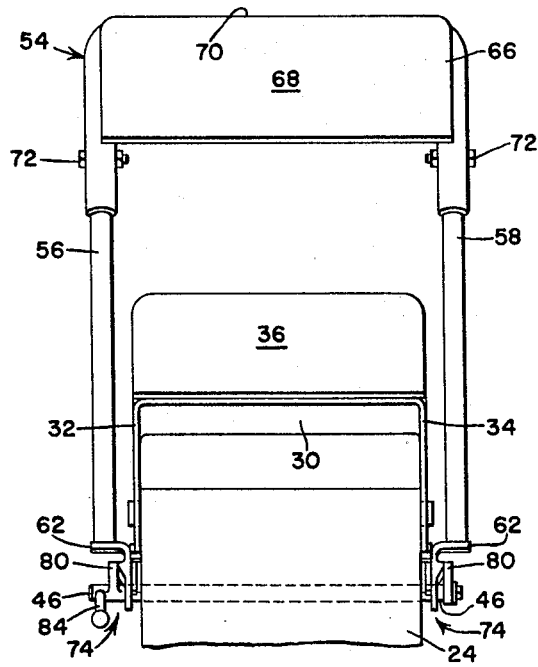

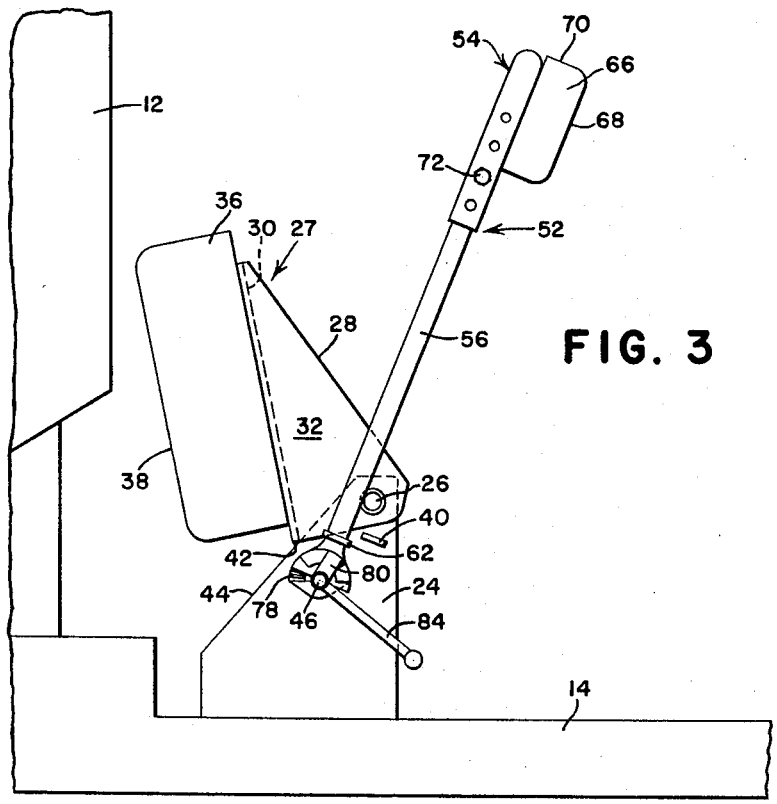
FIG. 3
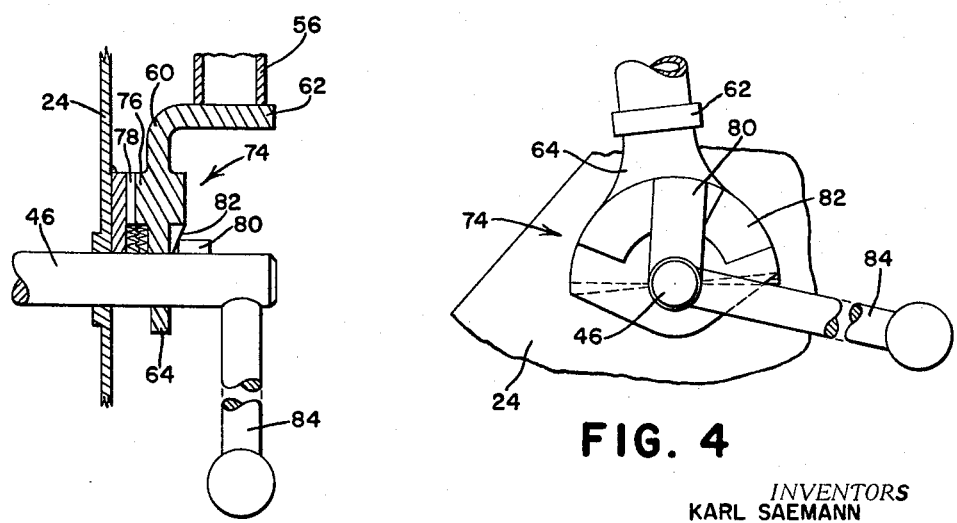
FIG. 5
FIG. 4
INVENTORS
KARL SAEMANN
KURT BÜHLER
RUDOLF GIBTNER
BY John M Nolan
ATTORNEY

United States Patent Office 3,279,850
Patented Oct. 18, 1966

3,279,850
SEAT CONSTRUCTION FOR A SELF-PROPELLED AGRICULTURAL MACHINE
Karl Saemann and Kurt Buhler, Zweibruecken, and Rudolf Gibtner, Biblis, Germany, assignors to Deere & Company, Moline, Ill., a corporation of Delaware
Filed Dec. 9, 1964, Ser. No. 417,077
Claims priority, application Germany, Dec. 13, 1963, D 43,165
9 Claims. (Cl. 297—335)

This invention relates to a vehicle seat structure and more particularly to a foldable, adjustable seat structure for self-propelled agricultural machines such as combines or the like.

In the operation of such machines it is frequently necessary that the operator stand to enlarge his field of vision. It is therefore desirable that the operator's seat be movable into a position where it will not interfere with the operator while he is in a standing position. In addition, the comfort of the operator while using the seat structure is of primary importance.

Many types of folding seats have previously been designed for use in agricultural machines. However, most of said seats, to some extent, have not considered the comfort of the operator, or have not been completely movable out of the operator's way, or have been complicated and difficult to manufacture and operate. The present invention provides a seat structure having a backrest which is both vertically and horizontally adjustable relative to the surface of the seat to provide a comfortable seat structure regardless of the size or shape of the operator. In addition, the seat and backrest can easily be swung completely out of the operator's way for standing operation of the vehicle.

In the standing operation of a vehicle, it is impossible to operate the foot actuated clutch and brake mechanisms simultaneously. Moreover, prolonged operation in this position fatigues the operator. It is another feature of the present invention that the backrest can be swung forwardly while the seat is folded back to provide a leaning support or elevated seat for the operator, allowing him to use both feet on the controls as well as increasing his comfort while he is in an upright position. The vertical adjustment of the backrest also allows the adaptation of the elevated seat or support to the height of the individual operator.

Accordingly, it is a primary object of the invention to provide a comfortable vehicle seat which will completely fold out of the operator's way for stand-up operation of the vehicle.

It is a further object to provide such seat structure having a backrest which is movable independently of the seat and which can be swung forwardly to provide a leaning support or elevated seat for the operator.

Another object is to provide such a backrest which is vertically adjustable to accommodate the individual operator.

It is still another object to provide such a seat structure of simple and rugged construtcion which can easily be manipulated while the vehicle is in operation.

These and other objects of the invention will become apparent from the following detailed description and accompanying drawings wherein:

FIG. 1 is a side elevation view of the seat structure mounted on the operator's platform of a typical self-propelled agricultural machine, the seat being positioned for sit-down operation of the vehicle.

FIG. 2 is a front elevation view of the seat structure in the position shown in FIG. 1.

FIG. 3 is a view similar to FIG. 1 with the backrest positioned to support the operator in an elevated or leaning position and the seat moved to a folded position.

FIG. 4 is an enlarged elevation view of the backrest locking device shown in FIG. 1, the lock being in an engaged position.

FIG. 5 is a central vertical section of the locking means immediately prior to a disengagement.

Referring now to the drawings, there is shown an operator's station, indicated generally by the numeral 10, on a typical self-propelled agricultural machine, including an upright panel 12 at the rear of the operator's station and a horizontal operator's platform 14. It is to be understood that such words as "horizontal," "vertical," "forward," "rear," "upwardly," "downwardly," etc. are mere words of convenience used herein to more clearly describe the invention and are not to be construed as limiting terms.

Projecting upwardly from the front end of the operator's platform 14 is a steering column 16 having a steering wheel 18 mounted at its upper end. A brake control pedal 20 and a clutch pedal 22 project upwardly from the platform 14 on opposite sides of the steering column 16.

A generally upright support 24 projects upwardly from the operator's platform 14 rearwardly from the steering column and carries a horizontal seat pivot 26 transverse to the direction of machine travel proximate to its upper, forward edge.

A seat, indicated generally by the numeral 27, includes an elongated inverted U-shaped support member 28 having a normally horizontal bight portion 30 extending between depending sides 32 and 34, and a seat cushion 36 mounted on the bight portion 30 having a normally horizontal seating surface 38. The sides 32 and 34 are swingably mounted on the pivot 26 at their lower, rear portions for movement of the seat 27 in a vertical arc between a normal or seating position with the seating surface 38 horizontal as shown in FIG. 1 and a folded position with the seating surface substantially vertical and proximate to the panel 12 as shown in FIG. 3.

In the seating position, the seat is supported by stop means 40 projecting from the support 24 into the path of the side walls, the seat being maintained in this position by its own weight. In the folded position, the seat is supported by a rear edge 42 of the horizontal bight portion 30 which seats on an upper rear edge 44 of the support 24 and is maintained in this position by the weight of the seat which moves through a dead-center position when moving between the seating and folded positions.

A backrest pivot or shaft 46 is rotatably carried by the support 24 parallel to and spaced downwardly and rearwardly from the seat pivot 26, opposite ends of the pivot extending beyond the supporting structure. An inverted U-shaped backrest, indicated generally by the numeral 52, includes a horizontal bight portion or yoke 54 extending between depending legs or members 56 and 58 which have their ends swingably mounted on the pivot 46 via a pair of angle brackets 60, each bracket having a horizontal leg 62 affixed to a backrest leg and a vertical leg 64 swingably mounted on the pivot 46 for movement of the backrest in a vertical arc transverse to the pivot 46, the legs moving on opposite sides of the seat 27.

The yoke 54 includes a forwardly disposed backrest cushion 66 having a back-supporting surface 68 and an upper surface 70. The yoke is mounted for limited sliding movement along the legs 56 and 58 and is maintained at selected positions on the legs by a locking means 72, here shown as a bolt extending through one of a plurality of vertically spaced apart holes through the yoke and a corresponding hole in each leg whereby the distance between the yoke 54 and the pivot 46 can be selectively varied.

The backrest 52 is mounted at a selected position in its arc by a backrest locking means 74, here shown as a plurality of teeth 76 radially disposed about the shaft 46 on the vertical bracket leg 64 and axially engageable with a plurality of similar radially disposed teeth 78 on the support 24. The lower ends of the backrest legs 56 and 58 and their associated brackets 60 are biased outwardly by the yoke 54 toward a tooth-disengaging position. However, radial lugs 80 at opposite ends of the shaft 46 engage a cam surface 82 on the vertical bracket leg 64 whereby the brackets 60 are compressed along the axis of the shaft 46 into a tooth-engaging position by a counterclockwise rotation of the shaft 46 through the lever arm 84, locking the backrest to the support. The locking means is released by rotating the shaft 46 in a clockwise direction, the lug 80 sliding along the cam surface 82 permitting the axial separation of the teeth 76 and 78, as best seen in FIG. 5 where the locking means 74 is shown shortly before disengagement.

For normal or sit-down operation of the machine, the seat is swung against the stop means 40 into a seating position as shown in FIGS. 1 and 2, the seating surface 38 being substantially horizontal. The backrest 52 is locked in a generally vertical position with the back-supporting surface 68 being positioned approximately over the rear edge of the seat cushion 36, the height of the yoke 54 and consequently the cushion 66 being adjusted to accommodate the individual operator by sliding the yoke along the legs 56 and 58 and locking it at the desired height by locking means 72.

For standing operation of the machine, the seat 27 is swung upwardly and rearwardly between the backrest legs 56 and 58 and below the yoke 54 to the folded position shown in FIG. 3, where it is supported on the rear edge 42 of the support member 28. Since the seat pivots about its lower rear edge, it swings almost entirely behind the pivot 26 and does not interfere with the operator.

If it is necessary to operate the machine for a relatively extended length of time in the stand-up position or if it is necessary to operate the control pedals 20 and 22 in this position, the operator may swing and lock the backrest 52 in a forward position as shown in FIG. 3 in order that he may lean against the cushion 66 or sit on the top surface 70. In the latter position, both feet of the operator will be free to manipulate the control pedals 20 and 22. Since both the angle of the backrest about the pivot 46, and the distance of the yoke 54 from the pivot 46 are adjustable, the backrest will accommodate almost any operator in such a leaning or elevated seating position. The backrest locking means 74 can be easily manipulated by either the hand or foot of the operator and the seat can be similarly manipulated, allowing the operator to change positions of the seat structure during the operation of the machine.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A foldable vehicle seat structure comprising, a vehicle mounted support, a seat pivotally mounted on said support for movement in a vertical arc and including a seating surface, stop means for normally supporting the seat with the seating surface substantially horizontal, said seat being swingable upwardly and rearwardly about its rearward edge to a folded position, a backrest pivotally mounted on said support for movement in a vertical arc independently of and in the same direction as the seat between a first position generally above the rearward edge of the seat and a second position forwardly of the folded seat, and locking means operably engaging the backrest for retaining the backrest in any one of a plurality of selected positions between and including the first and second positions.

2. The invention defined in claim 1 wherein the backrest includes a pair of substantially parallel members pivotally connected at one end to the support and a yoke having a back-supporting surface extending between the free ends of said members, the seat being swingable between the members.

3. The invention defined in claim 2 wherein the yoke is slidably mounted on said members for longitudinal movement relative thereto and includes locking means for selectively affixing the yoke to the members, whereby the distance between the back-supporting surface and the backrest pivot is selectively adjustable.

4. A vehicle seat comprising, a support mounted on the vehicle and having an upper, forward edge, a horizontal pivot transverse to the direction of vehicle travel mounted on the support adjacent said upper forward edge, a seat, having a seating surface, swingably mounted on said pivot for movement between seating and folded positions, the seating surface being substantially horizontal in the seating position, the pivot being located adjacent the lower rear edge of the seat in the seating position, stop means on the support for supporting the seat in the seating position, the seat being swingable upwardly and rearwardly to its folded position, a backrest pivot carried by the support parallel to the seat pivot, an inverted U-shaped backrest, the lower ends of the depending legs being swingably mounted on said pivot for movement of the backrest in a vertical arc about said pivot, the horizontal bight portion including a back-supporting surface, locking means engaging the backrest for releasably retaining the backrest in a selected position, the seat being movable between the depending legs and beneath the horizontal bight portion.

5. The invention defined in claim 4 wherein the backrest includes means for selectively varying the effective length of the legs whereby the height of the back-supporting surface is adjustable.

6. The invention defined in claim 4 wherein the backrest pivot is positioned below and rearwardly from the seat pivot.

7. The invention defined in claim 6 wherein the backrest pivot comprises a rotatable shaft extending through the support and having a pair of parallel radial lugs on opposite sides of the support and a radial lever arm, and wherein the support has a plurality of teeth radially disposed about said shaft, the depending legs of the backrest being journaled on said shaft between said radial lugs and having a plurality of radially disposed teeth axially engageable with the support teeth, the depending legs being axially biased apart and having a cam surface engaging said lugs for axially moving the leg teeth into engaging and disengaging positions with the support teeth upon rotation of the shaft, whereby the backrest is selectively locked and unlocked.

8. In a self-propelled agricultural machine of the type having an operator's station including a platform, a seat structure comprising a generally upright support, having an upper, forward edge, mounted on the platform, a horizontal pivot transverse to the direction of machine travel mounted on the support adjacent the upper forward edge, a seat, having a seating surface, swingably mounted on said pivot for movement in a vertical arc between seating and folded positions, the seating surface being substantially horizontal in the seating position, the pivot being located adjacent the lower rear edge of the seat in the seating position, stop means on the support engaging the seat for supporting it in the seating position, the seat being swingable upwardly and rearwardly to its folded position, a backrest pivot carried by the support parallel to the seat pivot, an inverted U-shaped backrest, the lower ends of the depending legs being swingably mounted on said pivot for movement of the legs in a vertical arc on opposite sides of the seat, locking means engaging the backrest for releasably retaining the backrest in a selected position in its arc, the horizontal bight portion of the backrest including a back-supporting surface positionable in a generally vertical plane above the rear edge of the seating surface in the seating position, the backret being swingable forwardly and downwardly to a position for supporting the seat of the operator on the horizontal bight portion upwardly and forwardly from the seat portion in seating position.

9. In a self-propelled agricultural machine having an operator's station including a platform and controls located at a forward portion of the platform, a seat construction comprising a support on the platform in rearwardly spaced relation to the controls, a seat having a first position adapted to carry a seated operator in proximity to the controls, means mounting the seat on the support for swinging movement about a transverse axis between said first position and a second position displaced upwardly and rearwardly from said first position and affording more room for the operator to stand on the platform in proximity to the controls, a backrest having a first position at the rear of the seat in said first position of the seat and affording a backrest for the seated operator, means mounting the backrest on the support for movement independently of the seat between said first backrest position and a second backrest position forwardly from the first position aiding in supporting the operator in an elevated position, and locking means for maintaining the backrest in its alternate positions.

References Cited by the Examiner

UNITED STATES PATENTS

| | | | |
|---|---|---|---|
| 430,433 | 6/1890 | Peregrine | 297—331 |
| 557,406 | 3/1896 | Linn | 297—335 |
| 658,951 | 10/1900 | Kling | 297—94 |
| 1,017,488 | 2/1912 | Zimdars | 297—335 |
| 1,788,018 | 1/1931 | Ferris | 297—378 |
| 2,233,323 | 2/1941 | Nicol | 297—335 |
| 2,627,897 | 2/1953 | Apel | 297—336 |
| 2,700,411 | 1/1955 | Lamb | 297—378 |
| 2,988,398 | 6/1961 | Hamilton | 297—353 |

FRANK B. SHERRY, *Primary Examiner.*

FRANCIS K. ZUGEL, *Examiner.*